March 10, 1953 C. L. NELSON 2,631,061
LAWN SPRINKLING DEVICE
Filed Nov. 16, 1949
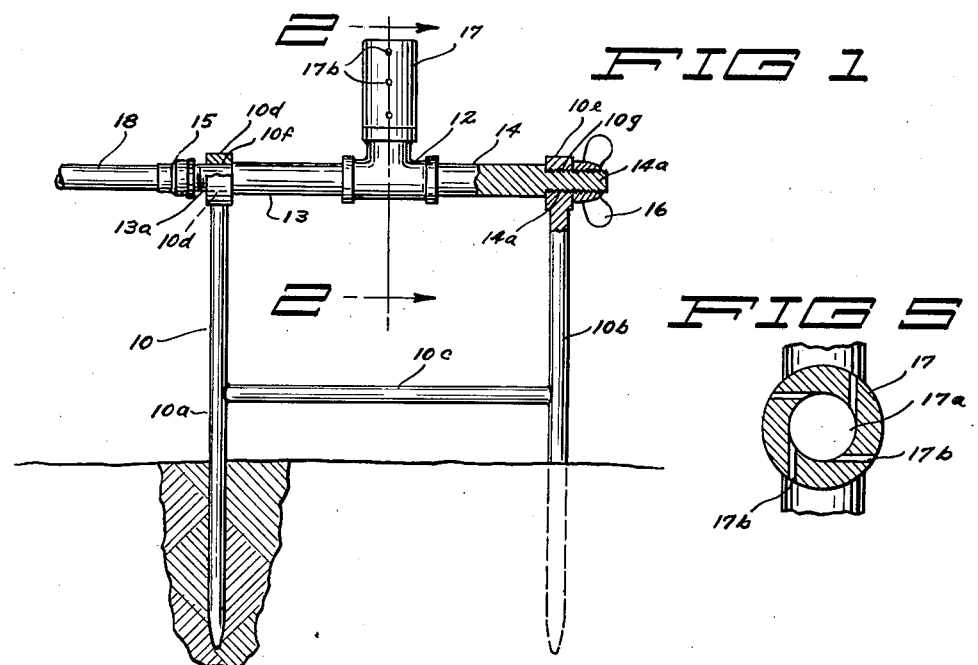
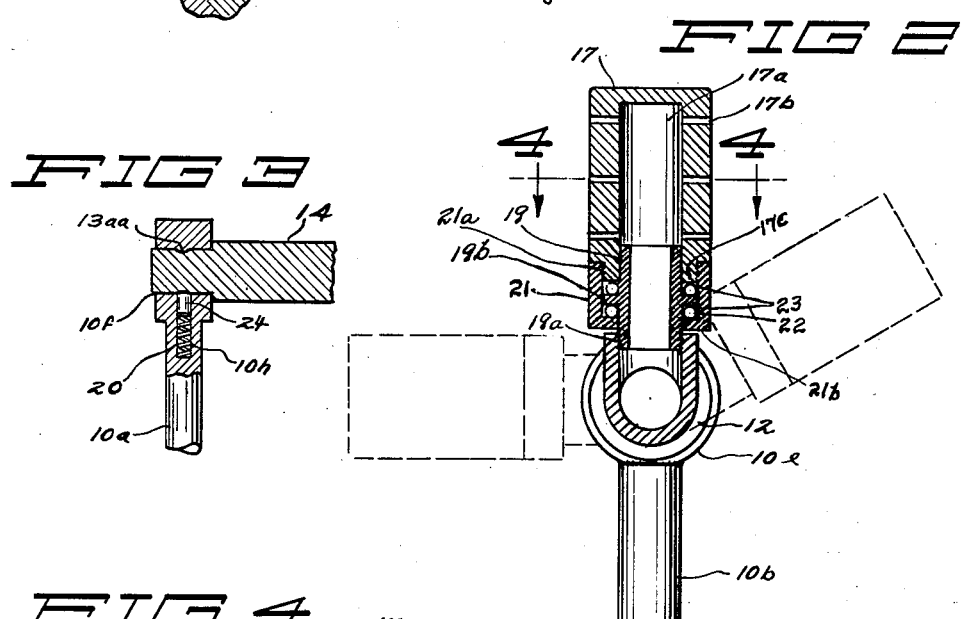
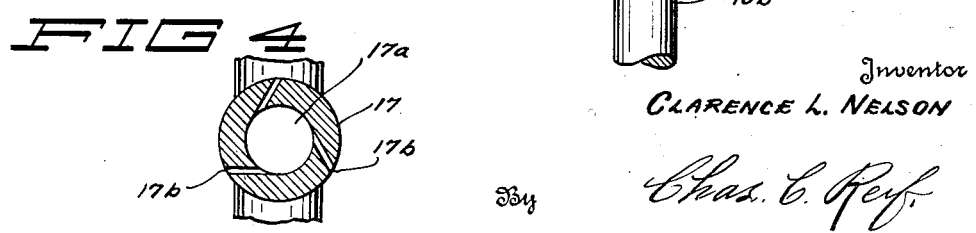
Inventor
CLARENCE L. NELSON
By Chas. C. Reif
Attorney Patented Mar. 10, 1953

2,631,061

UNITED STATES PATENT OFFICE 2,631,061

LAWN SPRINKLING DEVICE

Clarence L. Nelson, Minneapolis, Minn.

Application November 16, 1949, Serial No. 127,639

7 Claims. (Cl. 299—72)

This invention relates to a device for sprinkling a lawn or other desired areas. Generally a lawn sprinkling device is constructed to sprinkle a circular area only, whereas often the operator wishes to cover a rectangular area. As a result, an area much larger than desired is sprinkled. This results in excessive and wasteful use of water. Also where the operator wishes to increase the density of the spray, it is generally necessary to increase the pressure of the water used resulting in having not just a stronger flow of water but in addition having a larger area sprinkled.

It is therefore very desirable to have a sprinkling device which can be readily adjusted either to sprinkle a circular or a rectangular area. It is also very desirable to have a sprinkling device which can be adapted to have the density of the spray of water increased or decreased and yet cover the same given area.

It is an object of this invention to provide a sprinkling device which can be positioned wherever desired and which can be adapted to sprinkle either a circular or a rectangular area.

It is another object of this invention to provide a sprinkling device which can be adapted to precisely sprinkle a desired area and thus not cause any waste of water by sprinkling an excessive area.

It is a further object of this invention to provide a sprinkling device which can be readily adapted to have a greater or lesser density of spray of water in the same given area.

It is more particularly an object of this invention to provide a device having in combination, a bracket having spaced members adapted to be secured in the ground and having upper spaced portions, a conduit oscillatable about its axis extending between said upper spaced portions and journaled therein, a coupling secured to said conduit, a sprinkler head removably secured to said coupling and oscillatable with said conduit, a hose connection on said conduit whereby a hose can be connected to one end of said conduit, and means for securing said conduit and said sprinkler head in any given circumferential position.

These and other objects and advantages of the invention will be fully set forth in the following description made in connection with the accompanying drawings in which like reference characters refer to similar parts throughout the several views and in which:

Fig. 1 is a view in side elevation of applicant's sprinkling device showing some parts in section;

Fig. 2 is a view in vertical section taken on line 2—2 of Fig. 1 in the direction as indicated by the arrows, with some parts shown in different positions in dotted lines;

Fig. 3 is a view in vertical section showing a modification of the means shown in Fig. 1 used for securing said conduit and sprinkler head in a given circumferential position;

Fig. 4 is a view in vertical section of the conduit 13; and

Fig. 5 is a vertical section showing a modification of the structure shown in Fig. 4.

Referring to the drawings, a bracket 10 is shown in Fig. 1 comprising spaced members 10a and 10b having lower portions with pointed ends and adapted to be secured in the ground. Intermediate the ends of said members and extending therebetween is a cross member 10c. In the embodiment illustrated of this invention these members are rod-like in form and are made preferably as an integral unit made as a suitable casting or as a fabricated structure. Formed at the upper ends respectively of said members 10a and 10b are hubs 10d and 10e. Said hubs are of cylindrical form and are provided with longitudinal bores 10f and 10g. A T 12 is provided having two horizontal openings and a vertical opening. A conduit 13 and a rod-like member 14 are respectively and removably secured in the said horizontal openings of said T. Said members 13 and 14 are positioned to extend between hubs 10d and 10e and said members have reduced end portions 13a and 14a respectively journaled in said hubs and extending therethrough. Said end 13a is threaded to receive a hose connection 15 having secured thereto a hose 18. Said end 14a is threaded to receive a wing nut 16. Removably and rotatably secured to the vertical opening of said T 12 is a sprinkling head 17. Said sprinkling head 17 is provided with an inner chamber 17a, with vertically spaced sets of outwardly extending passageways 17b and with an exteriorly threaded lower reduced portion 17c. Passageways 17b extend tangentially to opening 17a. A short conduit 19 is provided having a lower exteriorly threaded portion 19a adapted to be received in the vertical opening of said T 12. The upper portion of said conduit extends upwardly for a short distance into the lower portion of said chamber 17a so that head 17 can rotate freely therebout. Spaced intermediate the ends of said conduit is an annular flange 19b having a diameter substantially the same as the reduced portion 17c of said sprinkling head. A sleeve 21 is provided having an upper interiorly threaded portion 21a adapted to be secured to said portion 17c and being provided with an inwardly extending portion 21b at its bottom, said portion being adapted to move freely circumferentially about member 19. When member 21 is disposed over conduit 19 and secured to the lower threaded portion of sprinkling head 17, passageways 23 are thereby formed above and below the annular flange 19b. Respectively disposed in said passageways are ball bearings 22. Said chamber 17a communicates with the passage in conduit 13. Thus the sprinkling head is able to rotate freely about its own axis and such rotation will be caused by the flow of water upwardly into chamber 17a and outwardly through the tangential passageways 17b. Conduit 13, T 12 and member 14 form an integral unit extending between said hubs 10d and 10e, and being journaled therein, form a unit oscillatable about the axis of members 13 and 14. Sprinkling head 17 is oscillatable with said members. Wing nut 16 can be tightened on said end 14a to hold said members and said sprinkling head in any given circumferential position. Thus it is seen that said sprinkling head is rotatable about its own axis and is oscillatable about the axis of members 13 and 14 so that it can be positioned in any given circumferential position.

In operation, said sprinkling device may be positioned where desired in the area to be sprinkled by pressing the lower portions of the members 10a and 10b into the ground. The garden hose 18 is coupled to the end of conduit 13. The wing nut 16 is loosened and the sprinkling head can then be circumferentially positioned at whatever angle desired. This sprinkling device will sprinkle either a circular area or a longitudinal area depending on the circumferential position of the sprinkling head. When the sprinkling head is in a vertical position a circular area will be sprinkled and when said sprinkling head is positioned horizontally, a rectangular area will be sprinkled. By positioning said sprinkling head at any intermediate point, a very precise adjustment can be secured to cover whatever area is desired without the waste of water being sprinkled on any excess area. When the sprinkling head is placed in the circumferential position desired, the wing nut 16 will be tightened which will clamp member 14 against the hub 10e and thus hold members 12, 13, 14 and the sprinkling head securely in the position desired. This oscillatable movement of the sprinkling head can readily be seen to have great advantage in adapting this sprinkling device to the needs of the operator and this is a very important feature of this device. Sprinkling heads may be provided having various numbers of openings and by the exchange of these sprinkling heads, the operator may secure whatever density of water he desires to have sprinkled.

Modifications of the sprinkling head 17 are shown in Figs. 4 and 5 where each vertically spaced set of outwardly extending passageways comprises either three or four openings. A further modification of the sprinkling device is shown in Fig. 3. Member 10a is provided with a vertical bore 10h directly below the horizontal bore 10f and communicating therewith. A coiled compression spring 20 is disposed in the bottom of said vertical bore and resting thereon is a plunger 24. Said plunger thereby is frictionally held against portion 13a which is journaled in said horizontal bore 10f. Portion 13a may be provided with circumferentially spaced recesses 13aa in which the end of plunger 21 may seat. With this construction clamping nut 16 may be omitted.

Thus it is seen that I have provided a sprinkling device which is simple in construction and highly efficient in operation being adaptable to the particular needs of the operator. This device is adjustable to permit the maximum utilization of water in sprinkling a given desired area. This device has been amply demonstrated in practice, has been found to be very efficient and highly satisfactory and is now being commercially made.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A lawn sprinkling device having in combination, a bracket having spaced portions adapted to be inserted in the ground and having upper spaced portions, a conduit extending between and mounted in said last mentioned portions for oscillation about its axis, a sprinkling head having a plurality of circumferentially and vertically spaced tangentially extending apertures therethrough and being rotatably connected to said conduit between said last mentioned portions and with its axis substantially at right angles to said axis, said conduit having at one end a portion adapted to receive a hose connection, and means at the other end of said conduit for holding the same and said head in different circumferential positions.

2. A lawn sprinkling device having in combination, a bracket having spaced portions adapted to be inserted in the ground and having upper spaced portions, hubs formed at the upper end of said last mentioned portions, a conduit oscillatable about its axis extending between said hubs and having reduced end portions journaled therein, a sprinkling head having a passage therein and a plurality of circumferentially and vertically spaced tangentially extending apertures therethrough, the same being rotatably secured to said conduit and spaced between said hubs, ball bearings disposed between said sprinkling head and said conduit whereby said sprinkling head rotates on said bearings, said conduit having a hose connection at one end and threaded to receive a wing nut at its other end for clamping said end against said hub and holding the same in different circumferential positions whereby said sprinkling head is movable to any desired position axially of said conduit and is rotatable about its own axis.

3. A lawn sprinkling device having in combination, a bracket having spaced portions adapted to be inserted in the ground and having upper spaced hubs, a conduit oscillatable about its axis extending between said hubs and having reduced end portions journaled therein and extending therethrough, said conduit comprising a T coupling and portions secured therein, a sprinkling head having a plurality of circumferentially and vertically spaced apertures extending therethrough and being freely rotatable to distribute water circumferentially connected to said coupling and oscillatable with said conduit, said conduit having a hose connection at one end, and means for holding said conduit in different circumferential positions.

4. A lawn sprinkling device having in combination, a sprinkling head having a passage therein and having outwardly extending passageways communicating with said passage and having an exteriorly threaded lower reduced portion, a T member having a portion with a vertical opening therein, a conduit adapted to have one end secured in the vertical opening of said T member and the other end received in said lower portion of said sprinkling head, said conduit having a flange thereabout intermediate its ends, said flange having a slightly smaller diameter than said lower reduced portion, a cup-shaped member having an upper interiorly threaded portion adapted to receive therein the lower threaded reduced portion of said sprinkling head, said cup-shaped member having a central opening in its bottom and having an inwardly extending portion adapted to move freely circumferentially about said conduit whereby chambers are formed above and below said flange, ball bearings disposed about said conduit above and below said flange, a substantially horizontal conduit having said T member secured therein, a bracket having upper spaced portions and having lower spaced portions adapted to be secured in the ground, said last mentioned conduit extending between and being journaled in said upper spaced portions and being movable oscillatably therein, said conduit having a hose connection at one end and having a holding means at its other end to hold the same in any desired circumferential position whereby water flowing through said passage in said sprinkling head will cause the rotation of the same and said sprinkling head is thus rotatable about its own axis and movable circumferentially about the axis of said last mentioned conduit.

5. A lawn sprinkling device having in combination, a supporting bracket having spaced portions, a horizontally disposed conduit extending between and carried in said portions and being movable about its axis to different circumferential positions, means for holding said conduit in different circumferential positions, one end of said conduit having a hose connection thereon, a hose attached to said connection and extending to a water supply, said hose being separate from and independent of said bracket, a member secured to said conduit between said portions having a portion with a passage therein extending at right angles to the axis of said conduit and communicating with said conduit, a second member secured to said member, a bearing supported on said second member, a sprinkling head coaxial with and communicating with said passage rotatably carried by said bearing and having a plurality of vertically and circumferentially spaced passages leading therefrom, said head being rotatable by a discharge of liquid through said passages whereby a spray of water is produced disposed in a plane perpendicular to the axis of said sprinkling head and said conduit and can be moved to dispose said plane at different angles to the horizontal.

6. A lawn sprinkling device having in combination, a supporting bracket having spaced portions, a substantially horizontal conduit extending between and carried in said portions, said conduit being movable about its axis to different positions in said portions and having a connection at one end adapted for the connection of a hose thereto, means at the other end of said conduit for clamping it to said bracket for holding it in different positions, a member secured to said conduit between said portions and having a portion with a passage therein extending at right angles to the axis of and communicating with said conduit, a sprinkling head carried by and coaxial with said portion and passage and having a chamber therein with a plurality of vertically and circumferentially spaced discharge passages leading therefrom tangentially to its axis, a bearing between said member and head on which said head is rotatable by the liquid discharged through said passages.

7. A lawn sprinkling device having in combination, a supporting bracket having spaced portions, a substantially horizontal member extending between and oscillatable in said portions and comprising a conduit, said conduit having a hose connected at one end, a member secured to said connection and extending to a water supply, said member being separate from and independent of said bracket, means for holding said member in different circumferential positions, a second member secured to said conduit and having a vertically extending passage therein, a third member secured to said second member and having a passage therethrough, a sprinkling head mounted for rotation on said third member, said sprinkling head having vertically and circumferentially spaced passages leading therefrom extending tangentially so that said head will be rotated by the discharge of liquid through said passages whereby said head will produce a spray of water disposed in a plane perpendicular to the axis of said head and said conduit can be adjusted to dispose said plane at different angles to the horizontal so that the amount of water discharged onto a certain area can be varied.

CLARENCE L. NELSON.

REFERENCES CITED

The following references are of record in the file of this patent:

UNITED STATES PATENTS

| Number | Name | Date |
| --- | --- | --- |
| 1,068,872 | Eichoff | July 29, 1913 |
| 1,383,449 | Coles | July 5, 1921 |
| 1,701,066 | Elkington | Feb. 5, 1929 |
| 1,953,837 | Thorold et al. | Apr. 3, 1934 |
| 2,090,284 | Carlson | Aug. 17, 1937 |

FOREIGN PATENTS

| Number | Country | Date |
| --- | --- | --- |
| 351,665 | Great Britain | July 2, 1931 |